(12) United States Patent
DeDecker et al.

(10) Patent No.: US 10,400,089 B2
(45) Date of Patent: Sep. 3, 2019

(54) METHOD OF MAKING POLYMERS, POLYMER COMPOSITIONS AND ARTICLES CONTAINING SUCH POLYMERS

(71) Applicant: Firestone Polymers, LLC, Akron, OH (US)

(72) Inventors: Mark N. DeDecker, North Canton, OH (US); Joseph P. Padolewski, Copley, OH (US); James H. Pawlow, Schwenksville, PA (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 14/405,624

(22) PCT Filed: Jun. 5, 2013

(86) PCT No.: PCT/US2013/044288
§ 371 (c)(1),
(2) Date: Dec. 4, 2014

(87) PCT Pub. No.: WO2013/184783
PCT Pub. Date: Dec. 12, 2013

(65) Prior Publication Data
US 2015/0166738 A1 Jun. 18, 2015

Related U.S. Application Data

(60) Provisional application No. 61/656,144, filed on Jun. 6, 2012.

(51) Int. Cl.
| *C08J 3/20* | (2006.01) |
| *C08K 5/5419* | (2006.01) |
| *C08C 2/06* | (2006.01) |
| *C08C 19/25* | (2006.01) |
| *C08C 19/44* | (2006.01) |
| *C08F 236/10* | (2006.01) |
| *C08J 3/12* | (2006.01) |
| *C08J 3/21* | (2006.01) |

(52) U.S. Cl.
CPC .............. *C08K 5/5419* (2013.01); *C08C 2/06* (2013.01); *C08C 19/25* (2013.01); *C08C 19/44* (2013.01); *C08F 236/10* (2013.01); *C08J 3/12* (2013.01); *C08J 3/21* (2013.01); *C08J 2309/06* (2013.01)

(58) Field of Classification Search
CPC ...... C08L 101/10; C07F 7/0836; C08F 36/06; B60C 1/0016
See application file for complete search history.

(56) References Cited

U.S. PATENT DOCUMENTS

| 2,821,232 | A | * | 1/1958 | Wolf | 152/209.1 |
| 3,244,664 | A | | 4/1966 | Zelinski et al. | |
| 3,423,385 | A | * | 1/1969 | Bebb | C07C 7/005 |
| | | | | | 526/173 |
| 4,185,042 | A | | 1/1980 | Verkouw | |
| 4,429,091 | A | | 1/1984 | Hall | |
| 4,788,254 | A | * | 11/1988 | Kawakubo et al. | 525/100 |
| 5,659,056 | A | | 8/1997 | Hergenrother et al. | |
| 6,255,404 | B1 | * | 7/2001 | Hogan et al. | 525/326.5 |
| 6,279,632 | B1 | | 8/2001 | Hogan et al. | |
| 6,369,167 | B1 | | 4/2002 | Morita et al. | |
| 6,393,167 | B1 | | 5/2002 | Davis et al. | |
| 7,342,070 | B2 | | 3/2008 | Tsukimawashi et al. | |
| 2002/0123554 | A1 | | 9/2002 | Ko et al. | |
| 2004/0254301 | A1 | | 12/2004 | Tsukimawashi et al. | |
| 2009/0163668 | A1 | | 6/2009 | Yamada et al. | |

FOREIGN PATENT DOCUMENTS

| CN | 85106673 A | 3/1987 |
| JP | S6134066 A | 2/1986 |
| JP | 2004051757 A | 2/2004 |
| RU | 2266917 C2 | 12/2005 |
| RU | 2320683 C2 | 3/2008 |
| WO | 0107513 A1 | 2/2001 |

OTHER PUBLICATIONS

Kim, Dong Seok, International Search Report with Written Opinion from PCT/US2013/044288, 10 pp. (dated Jan. 23, 2014).
Dreyfuss, P. et al., "Chemistry of Silane Coupling Reactions. 2. Reaction of Dimethylmethoxysilanated Poly(butadiene) with Triethylsilanol and with Glass," Macromolecules, vol. 11, No. 5, pp. 1036-1038 (Sep.-Oct. 1978).

* cited by examiner

*Primary Examiner* — Kuo Liang Peng
(74) *Attorney, Agent, or Firm* — Meredith E. Hooker

(57) ABSTRACT

A method of making a polymer with stable Mooney viscosity and molecular weight is described. A conjugated diolefin is reacted in a hydrocarbon solvent in the presence of an initiator to form a polymer. After forming the polymer, alkoxy silane terminal functionalizing groups are bonded to the polymer. A stabilizing agent having the formula $(R)_{4-n}Si(OH)_n$ wherein R is a $C_1$ to $C_{18}$ alkyl, $C_1$ to $C_{18}$ alkyl group containing a heteroatom such as nitrogen or oxygen, $C_4$ to $C_8$ cycloalkyl, or $C_6$ to $C_{18}$ aromatic group is then added to the polymer, optionally in the presence of hydrocarbon oil. The polymer is then desolvatizing, resulting in a polymer with stable Mooney viscosity and molecular weight, even over prolonged periods of time. Compositions and articles containing the polymer are also described.

15 Claims, 1 Drawing Sheet

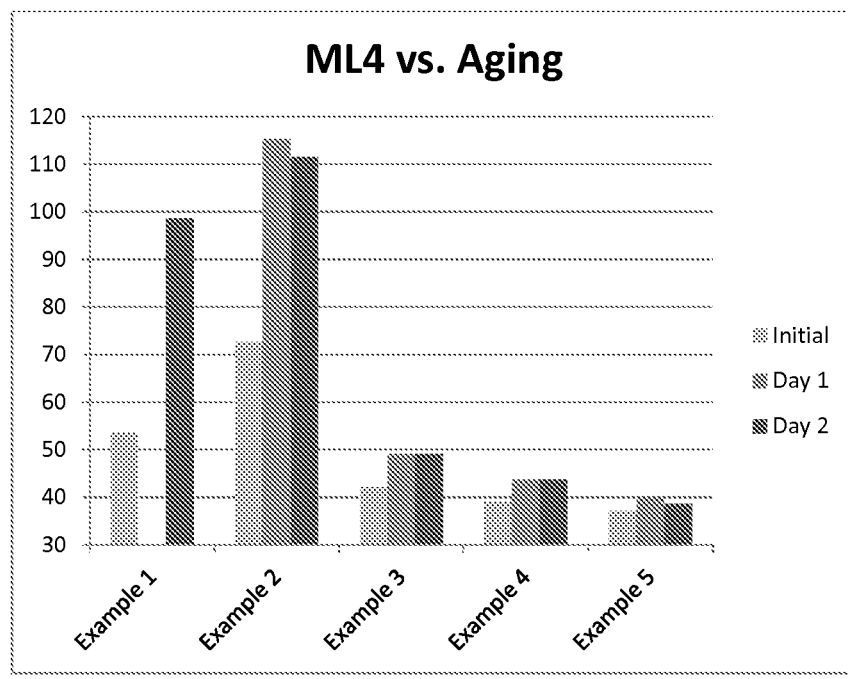

METHOD OF MAKING POLYMERS, POLYMER COMPOSITIONS AND ARTICLES CONTAINING SUCH POLYMERS

CROSS-REFERENCE TO RELATED APPLICATIONS

The present application may relate to subject matter disclosed in one or more of U.S. patent application Ser. No. 14/405,576 entitled "Method of Making Stabilized Polymers, Polymer Compositions, and Articles Containing Such Polymers", Ser. No. 14/405,501 entitled "Method of Making Iminosilane Stabilized Polymers, Polymer Compositions, and Articles Containing Such Polymers", and Ser. No. 14/405,501 entitled "Method of Making Polymers, Polymer Compositions, and Articles Containing Such Polymers". Each of the aforementioned applications is filed of even date herewith and assigned to an entity common hereto and shares an inventor common hereto. Further, the entirety of each and every one of the aforementioned applications is incorporated herein by reference for all purposes.

TECHNICAL FIELD

The field of art to which this invention generally pertains is conjugated diolefin polymers, methods of producing the same, and compositions and articles containing such polymers.

BACKGROUND

There is a constant search in the area of elastomeric polymers, such as styrene-butadiene rubbers, to control Mooney viscosity. Note, for example U.S. Pat. Nos. 5,659,056; 6,255,404; 6,393,167; 7,342,070; and published patent application No. 2009/0163668, the disclosures of which are incorporated by reference. Mooney viscosity creep with aging has become even more pronounced with the movement from batch to continuous polymerization.

Advantageous properties have been imparted to polymers which are typically terminated using a number of different functional compounds, including silane containing compounds, to yield silane end-capped polymers. Note also, for example, U.S. Pat. Nos. 3,244,664 and 4,185,042, the disclosures of which are incorporated by reference. This alkoxysilane termination may also result in an increase in the Mooney viscosity of the treated polymer. However, upon the subsequent process of desolventization of the alkoxysiloxane terminated polymers through the use of either steam or heated water, an even larger increase in Mooney viscosity often occurs during the hydrolysis of the alkoxysiloxane end groups such as pendant —SiOR groups on the siloxane end groups, thereby leading to coupling of the polymer via formation of Si—O—Si bonds between two end groups. Accordingly, many of the processes tried in the past do not actually prevent an increase in Mooney viscosity, but only slow the rate of the hydrolysis reaction and, therefore, the rate of coupling of the polymer. Over a period of time, for example during storage, the slow hydrolysis of the end groups will occur, thereby continuing the problem of increased Mooney viscosity and coupling of the alkoxysilane terminated polymers with aging.

Thus, while attempts have been made to reduce the rate of the hydrolysis reaction that results in the coupling of the alkoxysilane end groups of the polymers, the art has not provided a means or method by which to stabilize the polymer upon aging and essentially stop or slow down the coupling of the alkoxysilane terminated polymers over time.

BRIEF SUMMARY OF THE INVENTION

The present invention solves the above-mentioned problems through the use of methods for controlling the increase in Mooney viscosity and molecular weight of functionalized polymers, particularly during aging, e.g., storage over long periods of time. The methods involve reacting a conjugated diolefin in a hydrocarbon solvent in the presence of an initiator to form a polymer. Alkoxy terminal functionalizing groups may then be bonded to the polymer. Stabilizing agents may then be added to the polymer having the formula $(R)_{4-n}Si(OH)_n$ wherein R is a $C_1$ to $C_{18}$ alkyl, $C_1$ to $C_{18}$ alkyl group containing a heteroatom such as nitrogen or oxygen, $C_4$ to $C_8$ cycloalkyl, or $C_6$ to $C_{18}$ aromatic group, and n is 1 or 2. The polymer is then typically desolvatized, resulting in a polymer with stable Mooney viscosity.

Aspects of the invention include: the stabilizing agent being a trialkylsilanol, triarylsilanol, or diarylsilanediol; the stabilizing agent being a triarylsilanol; the stabilizing agent being a triphenylsilanol; the desolvatizing being performed by drum drying, direct drying, or steam desolvatizing; adding the stabilizing agent with the polymer in the presence of hydrocarbon oil; the initiator being a butyl lithium; the hydrocarbon solvent being one or more hexanes; the conjugated diolefin being a 1,3-butadiene; the polymerizing step including the presence of an aromatic vinyl compound; the aromatic vinyl compound being a styrene; and the hydrocarbon oil being a black oil.

Aspects of the invention include: drying the polymer after steam desolvatizing; the polymers produced according to methods of this invention; rubber compositions containing fillers and the polymers produced according to methods of this invention; and tires containing rubber compositions of this invention.

These and other objects, aspects, embodiments and features of the invention will become more fully apparent when read in conjunction with the following detailed description.

BRIEF DESCRIPTION OF THE DRAWINGS

FIG. 1 shows Mooney viscosity data for various samples.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments, with occasional reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Attempts to address Mooney viscosity deterioration in polymers are described, for example, in U.S. Pat. No. 5,659,056, which describes a process to treat the polymer prior to desolventization with a $C_1$ to $C_{12}$ aliphatic or $C_6$ to $C_{12}$ cycloaliphatic or aromatic carboxylic acid viscosity stabilizing agent soluble in the solvent used to prepare the polymer. U.S. Pat. No. 6,255,404 describes a method for stabilizing the Mooney viscosity of a siloxane-terminated polymer having at least one hydrolyzable substituent on the siloxane end group with an alkyl trialkoxysilane viscosity stabilizing agent. U.S. Pat. No. 6,369,167 teaches improving polymer properties by reacting the terminal end groups of the polymer with a compound having alkylideneamino groups. U.S. Pat. No. 7,342,070 teaches improving polymer properties by bonding a primary amino group and an alkoxysilyl group to the polymer chain. And U.S. Pub. No. 2009/0163668 describes a method of improving polymer properties by reacting the active end groups of the polymer with a specific low molecular weight compound having a secondary amino group in which a hydrogen atom is substituted with a triorgano-substituted silyl group, an organic group having an N atom not adjacent to the N atom of the secondary amino group, and at least one alkoxysilyl group or a specific low molecular compound containing a heterocycle having a secondary amino group in which a hydrogen atom is substituted with a triorgano-substituted silyl group and at least one alkoxysilyl group. Alkoxysilane-terminated polymers are also well known in the art and have been prepared, for example, as described in U.S. Pat. No. 6,255,404 to Hogan, the disclosure of which is incorporated by reference. Issues still exist, however, with controlling Mooney viscosity and molecular weight, especially over time, for example, in long term storage.

The present invention not only produces polymers with acceptable Mooney viscosity levels and molecular weight as produced, but controls these values over time, including over long term storage. The process of the present invention is particularly applicable to any polymer having a terminal functionalized end group having a hydrolyzable substituent which, when hydrolyzed, is subject to cross linking with other hydrolyzed groups. The hydrolyzable group is typically a pendant —SiOR group wherein R is an alkyl, cycloalkyl, or aromatic group capable of coupling with a like or similar pendant —SiOR group to form an Si—O—Si bond.

Polymers that can be stabilized in accordance with the process of the present invention can be any conjugated diolefins known in the art including polybutadiene, polyisoprene, and the like, and copolymers thereof with monovinyl aromatics such as styrene, alpha methyl styrene and the like, and trienes such as myrcene. Thus, the polymers include diene homopolymers and copolymers thereof with aromatic vinyl compounds. Exemplary diene homopolymers are those prepared from diolefin monomers having from about 4 to about 12 carbon atoms. Exemplary vinyl aromatic polymers are those prepared from monomers having from about 8 to about 20 carbon atoms.

Preferred polymers include diene homopolymers such as polybutadiene and polyisoprene and copolymers such as styrene butadiene rubber (SBR). Polymers and copolymers can comprise from 100 to about 20 percent by weight of diene units and from 0 to about 80 percent by weight of monovinyl aromatic hydrocarbon or triene units, totaling 100 percent. The copolymers may be random copolymers or block copolymers. Block copolymers include, but are not limited to, poly(styrene-butadiene-styrene), which are thermoplastic polymers. The polymers utilized and treated in accordance with the process of the present invention display utility in a number of applications, including, for example, use in the manufacture of tires.

The polymers employed in the practice of this invention can be prepared by employing any polymerization techniques. These techniques include, but are not limited to, cationic and anionic techniques, transition metal or coordination catalyst techniques, emulsion techniques, etc. Similarly, any organic alkali metals and/or the organic alkali earth metals may be used in the polymerization process of the present invention, including alkyllithiums such as n-butyllithium, sec-butyllithium and t-butyllithium, alkylenedilithiums such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, and barium stearate.

Polymerization of the polymers may be conducted in the presence of an organolithium anionic initiator catalyst composition. The organolithium initiator employed may be any anionic organolithium initiators useful in the polymerization of 1,3-diene monomers. In general, the organolithium compounds include hydrocarbon containing lithium compounds of the formula $R(Li)_x$ wherein R represents hydrocarbon groups containing from one to about 20 carbon atoms, and preferably from about 2 to about 8 carbon atoms, and x is an integer from 1 to 2. Although the hydrocarbon group is preferably an aliphatic group, the hydrocarbon group may also be cycloaliphatic or aromatic. The aliphatic groups may be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organolithium compounds which are useful as anionic initiators in the polymerization of conjugated dienes in accordance with the process of the present invention include, but are not limited to, butyl lithium, n-butyl lithium, n-propyl lithium, isobutyl lithium, sec-butyl lithium, tertiary butyl lithium, amyl-lithium, and cyclohexyl lithium. Mixtures of different lithium initiator compounds also can be employed preferably containing one or more lithium compounds such as $R(Li)_x$, R and x as defined above. Other lithium catalysts which can be employed alone or in combination with the hydrocarbyl lithium initiators are tributyl tin lithium, lithium dialkyl amines, lithium dialkyl phosphines, lithium alkyl aryl phosphines and lithium diaryl phosphines. The preferred organolithium initiator is n-butyl lithium and in situ produced lithium hexamethylenimide initiator.

The amount of initiator required to effect the desired polymerization can be varied over a wide range depending upon a number of factors such as the desired polymer molecular weight, the desired 1,2- and 1,4-content of the conjugated diene, and the desired physical properties for the polymer produced. In general, the amount of initiator utilized may vary from as little as 0.2 millimole of lithium per 100 grams of monomers up to about 100 millimoles of lithium per 100 grams of monomers, depending upon the desired polymer molecular weight (typically 1,000 to 100,000,000 number average molecular weight).

The polymerizations of the present invention may be conducted in an inert solvent and would consequently be solution polymerizations. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these will modify the polymerization as to styrene distribution, vinyl content and rate of reaction. The preferred solvents are aliphatic hydrocarbons and of these solvents, hexane is particularly preferred, including blends and mixtures of hexanes, e.g., linear and branched, including such things as cyclohexane alone or mixed with other forms of hexane.

Polymerization conditions such as temperature, pressure and time are well known in the art for polymerizing the monomers as described with the anionic initiator as described. For example, for illustrative purposes only, the temperature employed in the polymerization is generally not critical and may range from about −60° C. to about 150° C. Preferred polymerization temperatures may range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living" polymer. The lithium proceeds to move down the growing chain as polymerization continues. Throughout formation or propagation of the polymer, the polymeric structure may be anionic and living. In other words, a carbon anion is present. A new batch of monomer subsequently added to the reaction can add to the living ends of the existing chains and increase the degree of polymerization. A living polymer, therefore, may include a polymeric segment having an anionic reactive end. Reference to anionically polymerized polymers or anionically polymerized living polymers refers to those polymers prepared by anionic polymerization techniques.

In order to promote randomization in copolymerization and to control vinyl content, one or more modifiers may optionally be added to the polymerization ingredients. Amounts range from 0 to about 90 or more equivalents per equivalent of lithium. Compounds useful as modifiers are typically organic and include those having an oxygen or nitrogen heteroatom and a non-bonded pair of electrons. Examples include dialkyl ethers of mono and oligo alkylene glycols; "crown" ethers; tertiary amines such as tetramethyethylene diamine (TMEDA); tetrahydrofuran (THF), THF oligomers linear and cyclic oligomeric oxolanyl alkanes and the like. Particular examples of these modifiers include potassium t-butylamylate and 2,2'-di(tetrahydrofuryl) propane. These modifiers are further described in U.S. Pat. No. 4,429,091, the disclosure of which in incorporated by reference.

Polymerization is begun by charging a blend of the monomer(s) and solvent to a suitable reaction vessel, followed by the addition of the modifier(s) and the initiator solution previously described. The procedure is carried out under anhydrous, anaerobic conditions. The reactants may be heated to a temperature of from about 23° C. to about 120° C., and are typically agitated for about 0.15 to about 24 hours. After polymerization is complete, the product may be removed from the heat and terminated with a functional end group as is conventionally done in the art, although termination could also be done without removal of heat. Prior to terminating the polymerization reaction with a functional end group, a coupling agent may be added to the polymerization reaction to increase the Mooney viscosity to a desired range. Tin coupling agents such as tin tetrachloride ($SnCl_4$) are well known in the art and may be added in varying amounts, typically in amounts of 0 to about 0.9 mole equivalents functionality per each mole equivalent of anionic initiator depending upon the desired Mooney viscosity of the polymer.

The functional terminated polymers described above may include any polymer having a terminal end group in which the end group contains one or more hydrolyzable pendant substituents. Exemplary alkoxy terminal functionalizing groups bonded to polymers are silane terminated polymers represented by the following formula:

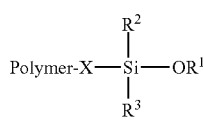

wherein X may be present or not present and represents a linking atom, chemical bond, or a linking group such as oxygen or sulfur, and wherein $R^1$ is a $C_1$ to $C_{18}$ alkyl, $C_1$ to $C_{18}$ alkyl group containing a heteroatom such as nitrogen or oxygen, $C_4$ to $C_8$ cycloalkyl, or $C_6$ to $C_{18}$ aromatic group, and $R^2$ and $R^3$ may be the same or different and are selected from the group consisting of —$OR^1$, a $C_1$ to $C_{18}$ alkyl, $C_4$ to $C_8$ cycloalkyl, or $C_6$ to $C_{18}$ aromatic group. A preferred functionalizing agent would be 3-(1,3,-dimethylbutylidene) aminopropyltriethoxysilane (DMBAPTES), represented in the above formula by $R^1$ being $C_2$, forming an ethoxy group, $R^2$ being the same group as $OR_1$ and $R^3$ being a 3-(1,3-dimethylbutylidene)aminopropyl group. In addition to the formula representation shown above, additional polymer chains could also be bonded through the $R^2$ and/or the $OR^1$ positions as well.

The process of the present invention, prior to quenching, drying or removing the solvent, e.g., by drum drying, with steam or heated water, or direct drying (e.g., List AG technology), and optionally further drying the polymer, adds trialkylsilanol, triarylsilanol, and/or diarylsilanediol stabilizing agents, and optionally hydrocarbon oil, to the polymer. Particularly preferred viscosity and molecular weight stabilizing agents are triphenylsilanols.

The viscosity stabilizing agents of the present invention can be employed in varying amounts and the amount employed is particularly dependent upon the type of alkoxysilane employed since reaction with the alkoxysilane terminated polymers is dependent upon the molar ratio of the added silanol to the alkoxysilane terminated polymer. For example, where a triarylsilanol is used, a significant amount of the agent will be necessary to provide a ratio which will supply a sufficiently high molar ratio of stabilizing agent to alkoxysilane terminated polymer. Nevertheless, for the silanols, preferred amounts may range from about 0.5 to about 50 mole equivalents per mole equivalent of anionic initiator, and more preferrably, a range of from about 1 mole to about 20 mole equivalents per mole equivalent of anionic initiator is desired, with 2 to 8 mole equivalents most typically used. The silanols may be added alone or as mixtures, as well as salts of the silanols, either as salt of the silanol preformed or formed in situ, e.g., as lithium, potassium, sodium, magnesium, calcium, etc. salts.

The viscosity stabilizing agents of the present invention react with the functional end groups of the polymer. However, because the Si—O—Si bonds being produced are between the polymer and the stabilizing agent additive, and not between the polymers themselves, there is no significant increase in Mooney viscosity.

The optionally added hydrocarbon oils such as aromatic or naphthenic oils can be used. The oil used is not particularly limited, and in fact any hydrocarbon oils such as those typically used with diene-based polymers can be used. A mineral based oil is preferably used. In general, commercially available mineral oils are mixtures of aromatic oils, alicyclic oils and aliphatic oils, and classified into the aromatic family, alicyclic family (naphthenic family) and aliphatic family (paraffinic family) according to the amount and ratio thereof. Any of them can be used in the present invention. However, black oil is particularly preferred.

Black oil is a relatively inexpensive, low-grade, black petroleum oil. It is typically described as liquid crude oil or heavy fuel oil. It is commercially available and can be purchased from Ergon under the brand name HYPRENE BO300, for example.

In addition to the viscosity stabilizing agent, an antioxidant such as 2,6-di-t-butyl-4-methylphenol or butylated hydoxy toluene (BHT) may be added in solvent (hexane) solution, as is well known in the art. The antioxidant reduces the likelihood that Mooney viscosity stability is not due to oxidative coupling.

Optionally, upon termination, the functional terminated polymer could be quenched, if necessary, and dried. Quenching may be conducted by contacting the alkoxysilane terminated polymer with a quenching agent for about 0.05 to about 2 hours at temperatures of from about 30° C. to about 120° C. to insure complete reaction. Suitable well known quenching agents include alcohol, water, carboxylic acids such 2-ethylhexanoic acid (EHA), acetic acid and the like. Coagulation is typically done with alcohols such as methanol or isopropanol. Alternative to, or in combination with, the step of quenching, the alkoxysilane terminated polymer may be drum dried as is well known in the art. The use of steam or high heat to remove solvent is also well known in the art.

The terminal functionalizing agent may be present in a molar ratio (to initiator) of about 0.25 to 2, and preferably about 0.5 to 1. The stabilizing agent may be present in a molar ratio of 0.5 to 50, more typically 1 to 20, and preferably 2 to 8. The hydrocarbon oil, when present, is typically present in an amount of 1 to 40 parts per hundred (phr) parts polymer, and preferably 1 to 20 phr.

While polymers according to the present invention may be produced with Mooney viscosity less than 150, less than 120 is preferred, and less than 100 more preferred. Ideally, 40 to 80 is the most preferred target range. Control of increase in Mooney viscosity over time is also one of the real advantages of the present invention. Changes in Mooney viscosity (increases) of less than 20 over a storage period of up to two years is preferred.

The invention is further illustrated by reference to the following examples. It will be apparent to those skilled in the art that many modifications, both to the materials and methods, may be practiced without departing from the purpose and scope of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example

The samples shown in Table 1 are from a continuous polymerization run using two stirred 20 gallon (75.7 liter) reactors with 105 pounds (47.6 kilograms) of hexane capacity at 70° F. (21° C.). The flow was added continuously at 20 weight % total monomer concentration in hexanes, 37 weight % of monomer consisting of styrene, 63 weight % of monomer consisting of 1,3-butadiene, with a total flow rate of 315 lbs/hr (142.9 kg/hr), resulting in 20 minute residence time. The initiator (500 grams of 3 weight % n-butyllithium) was added at the bottom of the reactor, with 0.33 molar ratio of 1,2-Butadiene/butyllithium, and 0.37 molar ratio of 2,2'-di(tetrahydrofuryl) propane to butyllithium. The first reactor ⅔ temperature (temperature measurement on the side of the reactor approximately at the ⅔ volume point from the bottom) was controlled to 221° F. (105° C.). After the first 20 gallon (75.7 liter) reactor, 0.5 molar ratio of DMBAPTS to bultyllithium was added, and continuously mixed in the second 20 (75.7 liter) gallon reactor. The polymer samples were collected in a blend tank for 2 hours, then BHT (1% based on polymer weight) and isopropanol for quenching was added to the blend tank. Two drums of polymer were extracted for further work. One drum was split into six 5 gallon (18.9 liter) samples with 18 pounds (8.16 kilograms) of polymer cement each. The samples were then treated as shown in Table 1 showing the total amount of stabilizing agent added. Numbers are molar ratios of stabilizing agent to butyllithium used for the polymerization.

As is well known in the art, polymer cement refers to polymer solutions, including polymer dissolved in a solvent, polymer suspended in a solvent, or a combination thereof. The resultant polymer samples were steam desolventized at 180° F. (82.2° C.), then dried in an air oven at 70° C. for 4 hours. The dried samples were aged at 100° C. ambient air humidity for 2 days. Mooney viscosity (at 100° C.) was measured at 1 and 2 days. The results of the Mooney viscosity tests and other testing are shown in the tables and graphs mentioned below. The accelerated polymer aging data is meant to simulate longer term storage, using a set temperature over a set period of time. In the examples, unless otherwise stated, 100° C. was used, over a period of 48 hours, in an ambient air oven.

TABLE 1

| Sample ID | Stabilizer Added | Initial | Day 1 | Day 2 |
|---|---|---|---|---|
| Example 1 | 7 OTES/BuLi | 53.6 | | 98.7 |
| Example 2 | None | 72.7 | 115.3 | 111.5 |
| Example 3 | 2 TPS/BuLi | 42.1 | 49.2 | 49.2 |
| Example 4 | 4 TPS/BuLi | 39.1 | 43.8 | 43.7 |
| Example 5 | 8 TPS/BuLi | 37.2 | 40.1 | 38.7 |

This data shows the Aged Mooney versus the molar amount of additive. This clearly shows that no additive results in very high Mooney after aging followed by the very high result with 7 moles of n-octyltriethoxysilane (OTES) per mole of BuLi. The addition of silanol results in low Mooney viscosity growth after aging compared to very high Mooney viscosity growth after addition of 7 moles of OTES. Addition of TPS (triphenylsilanol) provides near zero Mooney growth, even at only 2 moles/mole of BuLi. It is believed that the TPS, e.g., reacts with residual alkoxy silane groups of the polymer and forms a hydrolysis resistant moiety. The amount of TPS used is typically between about 0.1 and about 100 equivalents of TPS per residual SiOR bond, and preferably about 0.5 to about 2, and most preferably about 1. As shown above, Example 3 calculates to about 1.33, Example 4 to about 2.66, and Example 5 to about 5.33.

The invention is particularly suited for alkoxysilane functional terminated polymers, but is not necessarily limited thereto. The moisture stabilized polymers and method of the present invention can be used separately with other equipment, methods and the like, to produce various polymeric materials or compounds suitable for use in the production of various articles including pneumatic tires and the like, especially in the tread and sidewall portions of the tires. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a polymer comprising,
reacting a conjugated diolefin in a hydrocarbon solvent in the presence of an initiator to form a polymer,
bonding alkoxy silane terminal functionalizing groups to the polymer,
adding a stabilizing agent to the polymer having the formula $(R)_{4-n}Si(OH)_n$ wherein R is a $C_1$ to $C_{18}$ alkyl, $C_1$ to $C_{18}$ alkyl group containing a nitrogen or oxygen heteroatom, $C_4$ to $C_8$ cycloalkyl, or $C_6$ to $C_{18}$ aromatic group, n is 1 or 2,
and desolvatizing the polymer,
resulting in a polymer with stable Mooney viscosity and wherein the stabilizing agent is added to the polymer in the presence of black oil.

2. The method of claim 1, wherein the stabilizing agent is a trialkylsilanol, triarylsilanol, or diarylsilanediol.

3. The method of claim 1, wherein the stabilizing agent is a triarylsilanol.

4. The method of claim 3, wherein the stabilizing agent is triphenylsilanol.

5. The method of claim 1, wherein the desolvatizing is performed by drum drying, direct drying, or steam desolvatizing.

6. The method of claim 1, wherein the stabilizing agent is added to the polymer in the presence of hydrocarbon oil.

7. The method of claim 1, wherein the initiator is butyl lithium.

8. The method of claim 1, wherein the hydrocarbon solvent is one or more hexanes.

9. The method of claim 1, wherein the conjugated diolefin is 1, 3-butadiene.

10. The method of claim 1, wherein the polymerizing step includes the presence of an aromatic vinyl compound.

11. The method of claim 10, wherein the aromatic vinyl compound is styrene.

12. The method of claim 1 including drying the polymer after steam desolvatizing.

13. The polymer produced by the process of claim 1.

14. A rubber composition containing a filler and the polymer of claim 1.

15. A tire comprising a sidewall and/or a tread containing the rubber of claim 14.

* * * * *